(12) United States Patent
Mezger et al.

(10) Patent No.: US 10,377,958 B2
(45) Date of Patent: Aug. 13, 2019

(54) CORROSION INHIBITORS FOR FUELS AND LUBRICANTS

(71) Applicant: BASF SE, Ludwigshafen (DE)

(72) Inventors: Jochen Mezger, Lautersheim (DE); Maxim Peretolchin, Lambrecht (DE); Aaron Flores-Figueroa, Mannheim (DE); Markus Hansch, Speyer (DE); Ivette Garcia Castro, Ludwigshafen (DE); Klaus Muehlbach, Gruenstadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/115,594

(22) PCT Filed: Jan. 29, 2015

(86) PCT No.: PCT/EP2015/051752
§ 371 (c)(1),
(2) Date: Jul. 29, 2016

(87) PCT Pub. No.: WO2015/114029
PCT Pub. Date: Aug. 6, 2015

(65) Prior Publication Data
US 2017/0183590 A1    Jun. 29, 2017

(30) Foreign Application Priority Data

Jan. 29, 2014   (EP) ..................................... 14152991
Dec. 4, 2014    (WO) ................. PCT/EP2014/076622
Dec. 16, 2014   (EP) ..................................... 14198266

(51) Int. Cl.
| | | |
|---|---|---|
| C10L 10/04 | (2006.01) |
| C08F 222/06 | (2006.01) |
| C08F 210/14 | (2006.01) |
| C10L 1/197 | (2006.01) |
| C10L 10/06 | (2006.01) |
| C10M 129/72 | (2006.01) |
| C10M 129/92 | (2006.01) |
| C10L 1/188 | (2006.01) |
| C10M 129/34 | (2006.01) |
| C10M 145/12 | (2006.01) |
| C10M 145/16 | (2006.01) |
| C10M 159/00 | (2006.01) |
| C10M 171/00 | (2006.01) |
| C10L 1/14 | (2006.01) |
| C10L 1/16 | (2006.01) |
| C10L 1/196 | (2006.01) |
| C10L 10/18 | (2006.01) |
| C10L 1/236 | (2006.01) |

(52) U.S. Cl.
CPC ............ *C10L 10/04* (2013.01); *C08F 210/14* (2013.01); *C08F 222/06* (2013.01); *C10L 1/146* (2013.01); *C10L 1/1641* (2013.01); *C10L 1/188* (2013.01); *C10L 1/1883* (2013.01); *C10L 1/1963* (2013.01); *C10L 1/1966* (2013.01); *C10L 1/1973* (2013.01); *C10L 1/1976* (2013.01); *C10L 10/18* (2013.01); *C10M 129/34* (2013.01); *C10M 129/72* (2013.01); *C10M 129/92* (2013.01); *C10M 145/12* (2013.01); *C10M 145/16* (2013.01); *C10M 159/005* (2013.01); *C10M 171/00* (2013.01); *C10L 1/2362* (2013.01); *C10L 1/2364* (2013.01); *C10L 1/2366* (2013.01); *C10L 1/2368* (2013.01); *C10L 10/06* (2013.01); *C10L 2230/22* (2013.01); *C10L 2270/023* (2013.01); *C10L 2270/026* (2013.01); *C10M 2205/028* (2013.01); *C10M 2207/123* (2013.01); *C10M 2209/084* (2013.01); *C10M 2209/086* (2013.01); *C10M 2217/022* (2013.01); *C10M 2217/024* (2013.01); *C10M 2217/026* (2013.01); *C10M 2217/028* (2013.01); *C10N 2230/04* (2013.01); *C10N 2230/12* (2013.01); *C10N 2230/54* (2013.01); *C10N 2240/103* (2013.01); *C10N 2240/104* (2013.01); *C10N 2260/00* (2013.01)

(58) Field of Classification Search
CPC combination set(s) only.
See application file for complete search history.

(56) References Cited

U.S. PATENT DOCUMENTS

| | | |
|---|---|---|
| 3,382,056 A | 5/1968 | Mehmedbasich |
| 4,491,455 A | 1/1985 | Ishizaki et al. |
| 4,877,416 A | 10/1989 | Campbell |
| 4,959,077 A | 9/1990 | Martischius et al. |
| 5,080,686 A | 1/1992 | Garrecht et al. |
| 6,743,266 B2 | 6/2004 | DeRosa et al. |
| 2006/0196110 A1 | 9/2006 | Schwahn et al. |

(Continued)

FOREIGN PATENT DOCUMENTS

| | | |
|---|---|---|
| CN | 102958949 A | 3/2013 |
| DE | 38 26 608 A1 | 2/1990 |

(Continued)

OTHER PUBLICATIONS

International Search Report dated Mar. 18, 2015 in PCT/EP2015/051752.

(Continued)

*Primary Examiner* — Ellen M McAvoy
*Assistant Examiner* — Chantel L Graham
(74) *Attorney, Agent, or Firm* — Oblon, McClelland, Maier & Neustadt, L.L.P.

(57) ABSTRACT

The present invention relates to novel uses of corrosion inhibitors in fuels and lubricants.

15 Claims, 1 Drawing Sheet

(56) References Cited

U.S. PATENT DOCUMENTS

| | | | | |
|---|---|---|---|---|
| 2013/0133243 A1* | 5/2013 | Roger-Gopfert | ........ | C10L 1/221 44/330 |
| 2013/0227878 A1 | 9/2013 | Wolf et al. | | |

FOREIGN PATENT DOCUMENTS

| | | |
|---|---|---|
| DE | 38 38 918 A1 | 5/1990 |
| DE | 41 42 241 A1 | 6/1993 |
| DE | 43 09 074 A1 | 9/1994 |
| DE | 196 20 262 A1 | 11/1997 |
| EP | 0 061 895 A2 | 10/1981 |
| EP | 0 244 616 A2 | 11/1987 |
| EP | 0 299 120 A1 | 1/1989 |
| EP | 0 307 815 A1 | 3/1989 |
| EP | 0 310 875 A1 | 4/1989 |
| EP | 0 356 725 A | 3/1990 |
| EP | 0 452 328 A1 | 10/1991 |
| EP | 0 476 485 A1 | 3/1992 |
| EP | 0 548 617 A2 | 6/1993 |
| EP | 0 639 632 A1 | 2/1995 |
| EP | 0 700 985 A1 | 3/1996 |
| EP | 0 831 141 A1 | 3/1998 |
| JP | 55-85679 A | 6/1980 |
| RU | 2005 134 823 | 6/2006 |
| WO | WO 91/03529 A1 | 3/1991 |
| WO | WO 93/18115 A1 | 9/1993 |
| WO | WO 94/24231 A1 | 10/1994 |
| WO | WO 96/03367 A1 | 2/1996 |
| WO | WO 96/03479 A1 | 2/1996 |
| WO | WO 97/03946 A1 | 2/1997 |
| WO | WO 99/29748 A1 | 6/1999 |
| WO | WO 00/44857 A2 | 8/2000 |
| WO | WO 00/47698 A1 | 8/2000 |
| WO | WO 2004/035715 A1 | 4/2004 |
| WO | 2004/090079 A1 | 10/2004 |
| WO | WO 2005/054314 A2 | 6/2005 |
| WO | WO 2013/101256 A2 | 7/2013 |

OTHER PUBLICATIONS

U.S. Appl. No. 14/784,305, filed Oct. 14, 2015, US 2016-0075801 A1, Christian Schade, et al.
U.S. Appl. No. 15/115,500, filed Jul. 29, 2016, Maxim Peretolchin.
Office Action dated Sep. 27, 2018 in Russian Patent Application No. 2016134922, filed Jan. 29, 2015.
Office Action dated Oct. 31, 2018 in Chinese Patent Application No. 2015800128046.

* cited by examiner

CORROSION INHIBITORS FOR FUELS AND LUBRICANTS

CROSS-REFERENCE TO RELATED APPLICATIONS

This application is a National Stage of PCT/EP2015/051752, which was filed on Jan. 29, 2015. This application is based upon and claims the benefit of priority to European Application No. 14152991.7, which was filed on Jan. 29, 2014, and to PCT/EP2014/076622, which was filed on Dec. 4, 2014, and to European Application No. 14198266.0, which was filed on Dec. 16, 2014.

BACKGROUND OF THE INVENTION

The present invention relates to novel uses of corrosion inhibitors in fuels and lubricants.

Corrosion inhibitors are standard additives in fuels and lubricants, which are often based on structures containing acid groups, for example dimer fatty acids.

A disadvantage of these corrosion inhibitors is that they have a tendency to precipitate, especially in the presence of calcium ions, as a result of which their corrosion-inhibiting action is reduced. The deposits formed as a result of this precipitation can additionally impair the working of engines, engine constituents or parts of the fuel system, especially the injection system, specifically the injection pumps or nozzles.

The "injection system" is understood to mean the part of the fuel system in motor vehicles from the fuel pump up to and including the injector outlet. "Fuel system" is understood to mean the components of motor vehicles that are in contact with the particular fuel, preferably the region from the tank up to and including the injector outlet.

In one embodiment of the present invention, the inventive compounds counteract deposits not just in the injection system but also in the rest of the fuel system, here especially deposits in fuel filters and pumps.

The problem addressed was therefore that of providing corrosion inhibitors which exhibit elevated compatibility with respect to calcium ions and at the same time maintain their effect as a corrosion inhibitor.

The problem is solved by the use according to the claims.

U.S. Pat. No. 3,382,056 teaches the use of low molecular weight copolymers comprising olefins and succinic acid and derivatives thereof in copolymerized form as anti-rust additives in refined fuel compositions.

JP 55-085679 teaches the use of hydrolytically opened copolymers of molar mass Mw from 2000 to 30 000 from α-olefins having 20 to 60 carbon atoms and maleic anhydride as oil-soluble rust inhibitors in mineral oil or lubricants.

U.S. Pat. No. 5,080,686 and EP 299120 disclose that alkyl- and alkenylsuccinic acids and derivatives thereof and copolymers comprising olefins and succinic acid and derivatives thereof in copolymerized form function as corrosion inhibitors in oxygenated fuel systems.

It is not apparent from any of these documents that the corrosion inhibitors of the invention have elevated compatibility with respect to calcium ions.

BRIEF SUMMARY OF THE INVENTION

Accordingly, the invention provides the use of copolymers obtainable by
in a first reaction step (I) copolymerizing
(A) at least one ethylenically unsaturated mono- or dicarboxylic acid or derivatives thereof, preferably a dicarboxylic acid,
(B) at least one α-olefin having from at least 12 up to and including 30 carbon atoms,
(C) optionally at least one further aliphatic or cycloaliphatic olefin which has at least 4 carbon atoms and is different than (B) and
(D) optionally one or more further copolymerizable monomers other than monomers (A), (B) and (C), selected from the group consisting of
(Da) vinyl esters,
(Db) vinyl ethers,
(Dc) (meth)acrylic esters of alcohols having at least 5 carbon atoms,
(Dd) allyl alcohols or ethers thereof,
(De) N-vinyl compounds selected from the group consisting of vinyl compounds of heterocycles containing at least one nitrogen atom, N-vinylamides or N-vinyllactams,
(Df) ethylenically unsaturated aromatics,
(Dg) α,β-ethylenically unsaturated nitriles,
(Dh) (meth)acrylamides and
(Di) allylamines,
followed by
in a second optional reaction step (II) partly or fully hydrolyzing and/or saponifying anhydride or carboxylic ester functionalities present in the copolymer obtained from (I), the second reaction step being run at least when the copolymer obtained from reaction step (I) does not comprise any free carboxylic functionalities, as corrosion inhibitors in fuels and lubricants, preferably in fuels, more preferably in fuels having a content of alkali metals and/or alkaline earth metals and/or zinc of at least 0.1 ppm by weight.

DETAILED DESCRIPTION OF THE INVENTION

The copolymers described are found to be particularly advantageous in fuels or lubricants, particularly in fuels having a content of alkali metals and/or alkaline earth metals and/or zinc of at least 0.1 ppm by weight, more preferably at least 0.2 ppm by weight and even more preferably at least 0.3 ppm by weight and especially at least 0.5 ppm by weight. Also conceivable is a content of alkali metals and/or alkaline earth metals and/or zinc of at least 1 ppm by weight, preferably at least 2 and more preferably at least 3 ppm by weight.

It is an advantage of the copolymers described that they also exhibit their corrosion-inhibiting action in the presence of alkali metals and/or alkaline earth metals and/or zinc, preferably also in the presence of alkaline earth metals. The content of alkali metals and/or alkaline earth metals in fuels results, for example, from mixing with lubricants containing alkali metals and/or alkaline earth metals, for example in the fuel pump. In addition, alkali metals and/or alkaline earth metals may originate from non-desalinated or inadequately desalinated fuel additives, for example carrier oils. The entrainment of alkali metals and/or alkaline earth metals into the fuels can cause the abovementioned disadvantages. One example of a zinc source is antiwear additives.

Alkali metals include particularly sodium and potassium, especially sodium.

Alkaline earth metals include particularly magnesium and calcium, especially calcium.

Zinc should also be emphasized.

Particularly advantageously, the reaction products described are still active even in the presence of calcium and do not exhibit any precipitation.

The stated amounts of alkali metals and/or alkaline earth metals and/or zinc each relate to individual metal species.

Description of the Copolymer

The monomer (A) is at least one, preferably one to three, more preferably one or two and most preferably exactly one ethylenically unsaturated, preferably α,β-ethylenically unsaturated, mono- or dicarboxylic acid(s) or derivatives thereof, preferably a dicarboxylic acid or derivatives thereof.

Derivatives are Understood to Mean the corresponding anhydrides in monomeric or else polymeric form, mono- or dialkyl esters, preferably mono- or di-$C_1$-$C_4$-alkyl esters, more preferably mono- or dimethyl esters or the corresponding mono- or diethyl esters, and mixed esters, preferably mixed esters having different $C_1$-$C_4$ alkyl components, more preferably mixed methyl ethyl esters.

Preferably, the derivatives are anhydrides in monomeric form or di-$C_1$-$C_4$-alkyl esters, more preferably anhydrides in monomeric form.

In the context of this document, $C_1$-$C_4$-alkyl is understood to mean methyl, ethyl, iso-propyl, n-propyl, n-butyl, iso-butyl, sec-butyl and tert-butyl, preferably methyl and ethyl, more preferably methyl.

Examples of α,β-ethylenically unsaturated mono- or dicarboxylic acids are those mono- or dicarboxylic acids or derivatives thereof in which the carboxyl group or, in the case of dicarboxylic acids, at least one carboxyl group, preferably both carboxyl groups, is/are conjugated to the ethylenically unsaturated double bond.

Examples of ethylenically unsaturated mono- or dicarboxylic acids that are not α,β-ethylenically unsaturated are cis-5-norbornene-endo-2,3-dicarboxylic anhydride, exo-3,6-epoxy-1,2,3,6-tetrahydrophthalic anhydride and cis-4-cyclohexene-1,2-dicarboxylic anhydride.

Examples of α,β-ethylenically unsaturated monocarboxylic acids are acrylic acid, methacrylic acid, crotonic acid and ethylacrylic acid, preferably acrylic acid and methacrylic acid, referred to in this document as (meth)acrylic acid for short, and more preferably acrylic acid.

Particularly preferred derivatives of α,β-ethylenically unsaturated monocarboxylic acids are methyl acrylate, ethyl acrylate, n-butyl acrylate and methyl methacrylate.

Examples of dicarboxylic acids are maleic acid, fumaric acid, itaconic acid (2-methylenebutanedioic acid), citraconic acid (2-methylmaleic acid), glutaconic acid (pent-2-ene-1,5-dicarboxylic acid), 2,3-dimethylmaleic acid, 2-methylfumaric acid, 2,3-dimethylfumaric acid, methylenemalonic acid and tetrahydrophthalic acid, preferably maleic acid and fumaric acid and more preferably maleic acid and derivatives thereof.

More particularly, monomer (A) is maleic anhydride.

Monomer (B) is at least one, preferably one to four, more preferably one to three, even more preferably one or two and most preferably exactly one α-olefin(s) having from at least 12 up to and including 30 carbon atoms. The α-olefins (B) preferably have at least 14, more preferably at least 16 and most preferably at least 18 carbon atoms. Preferably, the α-olefins (B) have up to and including 28, more preferably up to and including 26 and most preferably up to and including 24 carbon atoms.

Preferably, the α-olefins may be linear or branched, preferably linear, 1-alkenes.

Examples of these are 1-dodecene, 1-tridecene, 1-tetradecene, 1-pentadecene, 1-hexadecene, 1-heptadecene, 1-octadecene, 1-nonodecene, 1-eicosene, 1-docosene, 1-tetracosene, 1-hexacosene, preference being given to 1-octadecene, 1-eicosene, 1-docosene and 1-tetracosene, and mixtures thereof.

Further examples of α-olefin (B) are those olefins which are oligomers or polymers of $C_2$ to $C_{12}$ olefins, preferably of $C_3$ to $C_{10}$ olefins, more preferably of $C_4$ to $C_6$ olefins. Examples thereof are ethene, propene, 1-butene, 2-butene, isobutene, pentene isomers and hexene isomers, preference being given to ethene, propene, 1-butene, 2-butene and isobutene.

Named examples of α-olefins (B) include oligomers and polymers of propene, 1-butene, 2-butene, isobutene, and mixtures thereof, particularly oligomers and polymers of propene or isobutene or of mixtures of 1-butene and 2-butene. Among the oligomers, preference is given to the trimers, tetramers, pentamers and hexamers, and mixtures thereof.

In addition to the olefin (B), it is optionally possible to incorporate at least one, preferably one to four, more preferably one to three, even more preferably one or two and especially exactly one further aliphatic or cycloaliphatic olefin(s) (C) which has/have at least 4 carbon atoms and is/are different than (B) by polymerization into the inventive copolymer.

The olefins (C) may be olefins having a terminal (α-) double bond or those having a non-terminal double bond, preferably having an α-double bond. The olefin (C) preferably comprises olefins having 4 to fewer than 12 or more than 30 carbon atoms. If the olefin (C) is an olefin having 12 to 30 carbon atoms, this olefin (C) does not have an α-double bond.

Examples of aliphatic olefins (C) are 1-butene, 2-butene, isobutene, pentene isomers, hexene isomers, heptene isomers, octene isomers, nonene isomers, decene isomers, undecene isomers and mixtures thereof.

Examples of cycloaliphatic olefins (C) are cyclopentene, cyclohexene, cyclooctene, cyclodecene, cyclododecene, α- or β-pinene and mixtures thereof, limonene and norbornene.

Further examples of olefins (C) are polymers having more than 30 carbon atoms of propene, 1-butene, 2-butene or isobutene or of olefin mixtures comprising the latter, preferably of isobutene or of olefin mixtures comprising the latter, more preferably having a mean molecular weight $M_w$ in the range from 500 to 5000 g/mol, preferably 650 to 3000 and more preferably 800 to 1500 g/mol.

Preferably, the oligomers or polymers comprising isobutene in copolymerized form have a high content of terminal ethylenic double bonds (α-double bonds), for example at least 50 mol %, preferably at least 60 mol %, more preferably at least 70 mol % and most preferably at least 80 mol %.

For the preparation of such oligomers or polymers comprising isobutene in copolymerized form, suitable isobutene sources are either pure isobutene or isobutene-containing $C_4$ hydrocarbon streams, for example $C_4$ raffinates, especially "raffinate 1", $C_4$ cuts from isobutane dehydrogenation, $C_4$ cuts from steamcrackers and from FCC crackers (fluid catalyzed cracking), provided that they have substantially been freed of 1,3-butadiene present therein. A $C_4$ hydrocarbon stream from an FCC refinery unit is also known as a "b/b" stream. Further suitable isobutene-containing $C_4$ hydrocarbon streams are, for example, the product stream of a propylene-isobutane cooxidation or the product stream from a metathesis unit, which are generally used after customary purification and/or concentration. Suitable $C_4$ hydrocarbon streams comprise generally less than 500 ppm, preferably less than 200 ppm, of butadiene. The presence of 1-butene and of cis- and trans-2-butene is substantially uncritical. Typically, the isobutene concentration in said $C_4$ hydrocarbon streams is in the range from 40% to 60% by weight. For instance, raffinate 1 generally consists essentially of 30% to 50% by weight of isobutene, 10% to 50% by weight of 1-butene, 10% to 40% by weight of cis- and trans-2-butene and 2% to 35% by weight of butanes; in the polymerization process of the invention, the unbranched butenes in the raffinate 1 are generally virtually inert, and only the isobutene is polymerized.

In a preferred embodiment, the monomer source used for polymerization is a technical $C_4$ hydrocarbon stream having an isobutene content of 1% to 100% by weight, especially of 1% to 99% by weight, in particular of 1% to 90% by weight, more preferably of 30% to 60% by weight, especially a raffinate 1 stream, a b/b stream from an FCC refinery unit, a product stream from a propylene-isobutane cooxidation or a product stream from a metathesis unit.

Especially when a raffinate 1 stream is used as isobutene source, the use of water as the sole initiator or as further initiator has been found to be useful, particularly when polymerization is effected at temperatures of −20° C. to +30° C., especially of 0° C. to +20° C. At temperatures of −20° C. to +30° C., especially of 0° C. to +20° C., however, it is possible to dispense with the use of an initiator when using a raffinate 1 stream as isobutene source.

Said isobutene-containing monomer mixture may comprise small amounts of contaminants such as water, carboxylic acids or mineral acids without causing any critical yield or selectivity losses. It is appropriate to the purpose to avoid accumulation of these impurities by removing such harmful substances from the isobutene-containing monomer mixture, for example, by adsorption on solid adsorbents such as activated carbon, molecular sieves or ion exchangers.

It is also possible, albeit less preferable, to convert monomer mixtures of isobutene or of the isobutene-containing hydrocarbon mixture with olefinically unsaturated monomers copolymerizable with isobutene. If monomer mixtures of isobutene with suitable comonomers are to be copolymerized, the monomer mixture comprises preferably at least 5% by weight, more preferably at least 10% by weight and especially at least 20% by weight of isobutene, and preferably at most 95% by weight, more preferably at most 90% by weight and especially at most 80% by weight of comonomers.

In a preferred embodiment, the mixture of the olefins (B) and optionally (C), averaged to their molar amounts, have at least 12 carbon atoms, preferably at least 14, more preferably at least 16 and most preferably at least 17 carbon atoms.

For example, a 2:3 mixture of docosene and tetradecene has an averaged value for the carbon atoms of $0.4 \times 22 + 0.6 \times 14 = 17.2$.

The upper limit is less relevant and is generally not more than 60 carbon atoms, preferably not more than 55, more preferably not more than 50, even more preferably not more than 45 and especially not more than 40 carbon atoms.

The optional monomer (D) is at least one monomer, preferably one to three, more preferably one or two and most preferably exactly one monomer(s) selected from the group consisting of
(Da) vinyl esters,
(Db) vinyl ethers,
(Dc) (meth)acrylic esters of alcohols having at least 5 carbon atoms,
(Dd) allyl alcohols or ethers thereof,
(De) N-vinyl compounds selected from the group consisting of vinyl compounds of heterocycles containing at least one nitrogen atom, N-vinylamides or N-vinyllactams,
(Df) ethylenically unsaturated aromatics and
(Dg) α,β-ethylenically unsaturated nitriles,
(Dh) (meth)acrylamides and
(Di) allylamines.

Examples of vinyl esters (Da) are vinyl esters of $C_2$- to $C_{12}$-carboxylic acids, preferably vinyl acetate, vinyl propionate, vinyl butyrate, vinyl pentanoate, vinyl hexanoate, vinyl octanoate, vinyl 2-ethylhexanoate, vinyl decanoate, and vinyl esters of Versatic Acids 5 to 10, preferably vinyl esters of 2,2-dimethylpropionic acid (pivalic acid, Versatic Acid 5), 2,2-dimethylbutyric acid (neohexanoic acid, Versatic Acid 6), 2,2-dimethylpentanoic acid (neoheptanoic acid, Versatic Acid 7), 2,2-dimethylhexanoic acid (neooctanoic acid, Versatic Acid 8), 2,2-dimethylheptanoic acid (neononanoic acid, Versatic Acid 9) or 2,2-dimethyloctanoic acid (neodecanoic acid, Versatic Acid 10).

Examples of vinyl ethers (Db) are vinyl ethers of $C_1$- to $C_{12}$-alkanols, preferably vinyl ethers of methanol, ethanol, iso-propanol, n-propanol, n-butanol, iso-butanol, sec-butanol, tert-butanol, n-hexanol, n-heptanol, n-octanol, n-decanol, n-dodecanol (lauryl alcohol) or 2-ethylhexanol.

Preferred (meth)acrylic esters (Dc) are (meth)acrylic esters of $C_5$- to $C_{12}$-alkanols, preferably of n-pentanol, n-hexanol, n-heptanol, n-octanol, n-decanol, n-dodecanol (lauryl alcohol), 2-ethylhexanol or 2-propylheptanol. Particular preference is given to pentyl acrylate, 2-ethyl hexyl acrylate, 2-propylheptyl acrylate.

Examples of monomers (Dd) are allyl alcohols and allyl ethers of $C_2$- to $C_{12}$-alkanols, preferably allyl ethers of methanol, ethanol, iso-propanol, n-propanol, n-butanol, iso-butanol, sec-butanol, tert-butanol, n-hexanol, n-heptanol, n-octanol, n-decanol, n-dodecanol (lauryl alcohol) or 2-ethylhexanol.

Examples of vinyl compounds (De) of heterocycles comprising at least one nitrogen atom are N-vinylpyridine, N-vinylimidazole and N-vinylmorpholine.

Preferred compounds (De) are N-vinylamides or N-vinyllactams.

Examples of N-vinylamides or N-vinyllactams (De) are N-vinylformamide, N-vinylacetamide, N-vinylpyrrolidone and N-vinylcaprolactam.

Examples of ethylenically unsaturated aromatics (Df) are styrene and α-methylstyrene.

Examples of α,β-ethylenically unsaturated nitriles (Dg) are acrylonitrile and methacrylonitrile.

Examples of (meth)acrylamides (Dh) are acrylamide and methacrylamide.

Examples of allylamines (Di) are allylamine, dialkylallylamine and trialkylallylammonium halides.

Preferred monomers (D) are (Da), (Db), (Dc), (De) and/or (Df), more preferably (Da), (Db) and/or (Dc), even more preferably (Da) and/or (Dc) and especially (Dc).

The incorporation ratio of the monomers (A) and (B) and optionally (C) and optionally (D) in the polymer obtained from reaction step (I) is generally as follows:

The molar ratio of (A)/((B) and (C)) (in total) is generally from 10:1 to 1:10, preferably 8:1 to 1:8, more preferably 5:1 to 1:5, even more preferably 3:1 to 1:3, particularly 2:1 to 1:2 and especially 1.5:1 to 1:1.5. In the particular case of maleic anhydride as monomer (A), the molar incorporation ratio of maleic anhydride to monomers ((B) and (C)) (in total) (in total) is about 1:1.

The molar ratio of obligatory monomer (B) to monomer (C), if present, is generally of 1:0.05 to 10, preferably of 1:0.1 to 6, more preferably of 1:0.2 to 4, even more preferably of 1:0.3 to 2.5 and especially 1:0.5 to 1.5.

In a preferred embodiment, no optional monomer (C) is present in addition to monomer (B).

The proportion of one or more of the monomers (D), if present, based on the amount of the monomers (A), (B) and optionally (C) (in total) is generally 5 to 200 mol %, preferably 10 to 150 mol %, more preferably 15 to 100 mol %, even more preferably 20 to 50 mol % and especially 0 to 25 mol %.

In a preferred embodiment, no optional monomer (D) is present.

In a second reaction step (II), the anhydride or carboxylic ester functionalities present in the copolymer obtained from (I) are partly or fully hydrolyzed and/or saponified.

Preferably, 10% to 100% of the anhydride or carboxylic ester functionalities present are hydrolyzed and/or saponified, preferably at least 20%, more preferably at least 30%, even more preferably at least 50% and particularly at least 75% and especially at least 85%.

For a hydrolysis, based on the anhydride functionalities present, the amount of water that corresponds to the desired hydrolysis level is added and the copolymer obtained from (I) is heated in the presence of the added water. In general, a temperature of preferably 20 to 150° C. is sufficient for the purpose, preferably 60 to 100° C. If required, the reaction can be conducted under pressure in order to prevent the escape of water. Under these reaction conditions, in general, the anhydride functionalities in the copolymer are converted selectively, whereas any carboxylic ester functionalities present in the copolymer react at least only to a minor degree, if at all.

For a saponification, the copolymer is reacted with an amount of a strong base corresponding to the desired saponification level in the presence of water.

Strong bases used may preferably be hydroxides, oxides, carbonates or hydrogencarbonates of alkali metals or alkaline earth metals.

The copolymer obtained from (I) is then heated in the presence of the added water and the strong base. In general, a temperature of preferably 20 to 130° C. is sufficient for the purpose, preferably 50 to 110° C. If required, the reaction can be conducted under pressure.

It is also possible to hydrolyze the carboxylic ester functionalities with water in the presence of an acid. Acids used are preferably mineral acids, carboxylic acids, sulfonic acids or phosphorus acids having a pKa of not more than 5, more preferably not more than 4.

Examples are acetic acid, formic acid, oxalic acid, salicylic acid, substituted succinic acids, aromatically substituted or unsubstituted benzenesulfonic acids, sulfuric acid, nitric acid, hydrochloric acid or phosphoric acid; the use of acidic ion exchange resins is also conceivable.

The copolymer obtained from (I) is then heated in the presence of the added water and the acid. In general, a temperature of preferably 40 to 200° C. is sufficient for the purpose, preferably 80 to 150° C. If required, the reaction can be conducted under pressure.

Should the copolymers obtained from step (II) still comprise residues of acid anions, it may be preferable to remove these acid anions from the copolymer with the aid of an ion exchanger and preferably exchange them for hydroxide ions or carboxylate ions, more preferably hydroxide ions. This is the case especially when the acid anions present in the copolymer are halides or contain sulfur or nitrogen.

The copolymer obtained from reaction step (II) generally has a weight-average molecular weight Mw of 0.5 to 20 kDa, preferably 0.6 to 15, more preferably 0.7 to 7, even more preferably 1 to 7 and especially 1.5 to 4 kDa (determined by gel permeation chromatography with tetrahydrofuran and polystyrene as standard).

The number-average molecular weight Mn is usually from 0.5 to 10 kDa, preferably 0.6 to 5, more preferably 0.7 to 4, even more preferably 0.8 to 3 and especially 1 to 2 kDa (determined by gel permeation chromatography with tetrahydrofuran and polystyrene as standard).

The polydispersity is generally from 1 to 10, preferably from 1.1 to 8, more preferably from 1.2 to 7, even more preferably from 1.3 to 5 and especially from 1.5 to 3.

The content of acid groups in the copolymer is preferably from 1 to 8 mmol/g of copolymer, more preferably from 2 to 7.5, even more preferably from 3 to 7 mmol/g of copolymer.

In a preferred embodiment, the copolymers comprise a high proportion of adjacent carboxylic acid groups, which is determined by a measurement of adjacency. For this purpose, a sample of the copolymer is heat-treated between two Teflon films at a temperature of 290° C. for a period of 30 minutes and an FTIR spectrum is recorded at a bubble-free site. The IR spectrum of Teflon is subtracted from the spectra obtained, the layer thickness is determined and the content of cyclic anhydride is determined.

In a preferred embodiment, the adjacency is at least 10%, preferably at least 15%, more preferably at least 20%, even more preferably at least 25% and especially at least 30%.

Use

The use of the invention relates to the inhibition of corrosion of iron surfaces, steel surfaces and/or nonferrous metal surfaces.

Among the nonferrous metals, preference is given to copper and alloys thereof.

Particular preference is given to inhibiting the corrosion of steel surfaces.

The copolymers described are added to fuels having the above-specified content of alkali metals and/or alkaline earth metals and/or zinc generally in amounts of 1 to 60 and preferably 4 to 50 ppm by weight, and more preferably from 10 to 40 ppm by weight.

Frequently, the copolymers described are used in the form of fuel additive mixtures, together with customary additives:

In the case of diesel fuels, these are primarily customary detergent additives, carrier oils, cold flow improvers, lubricity improvers, corrosion inhibitors other than the copolymers described, demulsifiers, dehazers, antifoams, cetane number improvers, combustion improvers, antioxidants or stabilizers, antistats, metallocenes, metal deactivators, dyes and/or solvents.

In the case of gasoline fuels, these are in particular lubricity improvers (friction modifiers), corrosion inhibitors other than the copolymers described, demulsifiers, dehazers, antifoams, combustion improvers, antioxidants or stabilizers, antistats, metallocenes, metal deactivators, dyes and/or solvents.

Typical examples of suitable coadditives are listed in the following section:

B1) Detergent Additives

The customary detergent additives are preferably amphiphilic substances which possess at least one hydrophobic hydrocarbon radical with a number-average molecular weight ($M_n$) of 85 to 20 000 and at least one polar moiety selected from:

(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or the alkali metal or alkaline earth metal salts thereof;
(De) sulfonic acid groups or the alkali metal or alkaline earth metal salts thereof;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_n$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar, especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene with $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described more particularly in WO-A 94/24231.

Further particular additives comprising monoamino groups (Da) are the hydrogenation products of the reaction products of polyisobutenes having an average degree of polymerization P=5 to 100 with nitrogen oxides or mixtures of nitrogen oxides and oxygen, as described more particularly in WO-A 97/03946.

Further particular additives comprising monoamino groups (Da) are the compounds obtainable from polyisobutene epoxides by reaction with amines and subsequent dehydration and reduction of the amino alcohols, as described more particularly in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described more particularly in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are especially reaction products of polyisobutene epoxides obtainable from polyisobutene having preferably predominantly terminal double bonds and $M_n$=300 to 5000, with ammonia or mono- or polyamines, as described more particularly in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and wherein some or all of the carboxyl groups have been converted to the alkali metal or alkaline earth metal salts and any remainder of the carboxyl groups has been reacted with alcohols or amines. Such additives are disclosed more particularly by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described more particularly in EP-A 639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. In the case of polyethers, such products also have carrier oil properties. Typical examples thereof are tridecanol butoxylates or isotridecanol butoxylates, isononylphenol butoxylates and also polyisobutenol butoxylates and propoxylates, and also the corresponding reaction products with ammonia.

Additives comprising carboxylic ester groups (Dg) are preferably esters of mono-, di- or tricarboxylic acids with long-chain alkanols or polyols, especially those having a minimum viscosity of 2 mm²/s at 100° C., as described more particularly in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also satisfy carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as, more particularly, ethylenediamine, diethylenetriamine, triethylenetetramine, tetraethylenepentamine, pentaethylenehexamine and hexaethyleneheptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine.

The polyisobutenyl-substituted phenols may originate from conventional or high-reactivity polyisobutene having $M_n$=300 to 5000. Such "polyisobutene Mannich bases" are described more particularly in EP-A 831 141.

One or more of the detergent additives mentioned can be added to the fuel in such an amount that the dosage rate of these detergent additives is preferably 25 to 2500 ppm by weight, especially 75 to 1500 ppm by weight, in particular 150 to 1000 ppm by weight.

B2) Carrier Oils

Carrier oils additionally used may be of mineral or synthetic nature. Suitable mineral carrier oils are fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyether-amines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are more particularly esters of mono-, di- or tricarboxylic acids with long-chain alkanols or polyols, as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is especially a straight-chain or branched $C_6$- to $C_{18}$-alkyl radical. Particular examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Particular carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

B3) Cold Flow Improvers

Suitable cold flow improvers are in principle all organic compounds which are capable of improving the flow performance of middle distillate fuels or diesel fuels under cold conditions. For the intended purpose, they must have sufficient oil solubility. More particularly, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is also possible to use mixtures of organic compounds effective as MDFIs and/or effective as WASAs and/or effective as nucleators.

The cold flow improver is typically selected from:
(K1) copolymers of a $C_2$- to $C_{40}$-olefin with at least one further ethylenically unsaturated monomer;
(K2) comb polymers;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally (α-olefins) or internally. However, preference is given to α-olefins, particular preference to α-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomers. When, for example, the olefin base monomer used is ethylene or propene, suitable further olefins are especially $C_{10}$- to $C_{40}$-α-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbyl radical may be linear or branched. Among these, preference is given to the vinyl esters. Among the carboxylic acids with a branched hydrocarbyl radical, preference is given to those whose branch is in the α position to the carboxyl group, and the α-carbon atom is more preferably tertiary, i.e. the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethyl hexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used.

Ethylene-vinyl acetate copolymers usable particularly advantageously and the preparation thereof are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$- to $C_{40}$ base olefins.

The copolymers of class (K1) preferably have a number-average molecular weight $M_n$ of 1000 to 20 000, more preferably of 1000 to 10 000 and especially of 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers, Structure and Properties", N. A. Plate and V. P. Shibaev, J. Poly. Sci. Macromolecular Revs. 8, pages 117 to 253 (1974). Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S. Pat. No. 4,491,455. Particular polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, especially at least two substituents, in the form of a tertiary nitrogen atom of the general formula $>NR^7$ in which $R^7$ is a $C_8$- to $C_{40}$-hydrocarbyl radical. The nitrogen substituents may also be quaternized, i.e. be in cationic form. Examples of such nitrogen compounds are ammonium salts and/or amides which are obtainable by the reaction of at least one amine substituted by at least one hydrocarbyl radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs; secondary amines suitable for this purpose are, for example, dioctadecylamine and methylbehenylamine. Also suitable for this purpose are amine mixtures, especially amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbyl radicals.

More particularly, the component of class (K4) is an oil-soluble reaction product of poly($C_2$- to $C_{20}$-carboxylic acids) having at least one tertiary amino group with primary or secondary amines. The poly($C_2$- to $C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb (IIa)

(IIb)

in which the variable A is a straight-chain or branched $C_2$- to $C_6$-alkylene group or the moiety of the formula III (III)

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and especially 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbyl radicals which may optionally be bonded to one another.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acids and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitamine, dicocoamine, distearylamine, dibehenylamine or especially ditallamine. A particularly preferred component (K4) is the reaction product of 1 mol of ethylenediaminetetraacetic acid and 4 mol of hydrogenated ditallamine.

Further typical examples of component (K4) include the N,N-dialkylammonium salts of 2-N',N'-dialkylamidobenzoates, for example the reaction product of 1 mol of phthalic anhydride and 2 mol of ditallamine, the latter being hydrogenated or unhydrogenated, and the reaction product of 1 mol of an alkenylspirobislactone with 2 mol of a dialkylamine, for example ditallamine and/or tallamine, the latter two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$- and $C_{15}$-alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

B4) Lubricity Improvers

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

B5) Corrosion Inhibitors Other than the Copolymer Described

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany), Irgacor® L12 (BASF SE) or HiTEC 536 (Ethyl Corporation).

B6) Demulsifiers

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

B7) Dehazers

Suitable dehazers are, for example, alkoxylated phenol-formaldehyde condensates, for example the products available under the trade names NALCO 7D07 (Nalco) and TOLAD 2683 (Petrolite).

B8) Antifoams

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

B9) Cetane Number Improvers

Suitable cetane number improvers are, for example, aliphatic nitrates such as 2-ethylhexyl nitrate and cyclohexyl nitrate and peroxides such as di-tert-butyl peroxide.

B10) Antioxidants

Suitable antioxidants are, for example substituted phenols, such as 2,6-di-tert-butylphenol and 6-di-tert-butyl-3-methylphenol, and also phenylenediamines such as N,N'-di-sec-butyl-p-phenylenediamine.

B11) Metal Deactivators

Suitable metal deactivators are, for example, salicylic acid derivatives such as N,N'-disalicylidene-1,2-propanediamine.

B12) Solvents

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

C) Fuels

The inventive use relates in principle to any fuels, preferably diesel fuels and gasoline fuels.

Middle distillate fuels such as diesel fuels or heating oils are preferably mineral oil raffinates which typically have a boiling range from 100 to 400° C. These are usually distillates having a 95% point up to 360° C. or even higher. These may also be what is called "ultra low sulfur diesel" or "city diesel", characterized by a 95% point of, for example, not more than 345° C. and a sulfur content of not more than 0.005% by weight or by a 95% point of, for example, 285°

C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

The inventive use in middle distillate fuels of fossil, vegetable or animal origin, which are essentially hydrocarbon mixtures, also relates to mixtures of such middle distillates with biofuel oils (biodiesel). Mixtures of this kind are encompassed by the term "middle distillate fuel". They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The examples which follow are intended to illustrate the present invention, without restricting it.

EXAMPLES

GPC Analysis

Unless stated otherwise, the mass-average molecular weight Mw and number-average molecular weight Mn of the polymers was measured by means of gel permeation chromatography (GPC). GPC separation was effected by means of two PLge Mixed B columns (Agilent) in tetrahydrofuran at 35° C. Calibration was effected by means of a narrow-distribution polystyrene standard (from PSS, Germany) having a molecular weight of 162-50 400 Da. Hexylbenzene was used as a marker for low molecular weight.

Preparation Examples

General Procedure

A reactor having an anchor stirrer was initially charged with the olefin or the mixture of olefins with or without solvent (as a bulk polymerization). The mixture was heated to the temperature specified under a nitrogen stream and while stirring. To this were added the free-radical initiator specified (optionally diluted in the same solvent) and molten maleic anhydride (1 equivalent based on olefin monomer). The reaction mixture was stirred at the same temperature for the reaction time specified and then cooled down. Water was subsequently added (unless stated otherwise, 0.9 equivalent based on maleic anhydride) and the mixture was stirred either at 95° C. for 10-14 h or under pressure at 110° C. for 3 h.

Synthesis Example 1

A 2 L glass reactor having an anchor stirrer was initially charged with a mixture of $C_{20}$-$C_{24}$ olefins (363.2 g, average molar mass 296 g/mol) and Solvesso 150 (231.5 g, DHC Solvent Chemie GmbH, Speldorf). The mixture was heated to 160° C. in a nitrogen stream and while stirring. To this were added, within 5 h, a solution of di-tert-butyl peroxide (29.6 g, from Akzo Nobel) in Solvesso 150 (260.5 g) and molten maleic anhydride (120.3 g). The reaction mixture was stirred at 160° C. for 1 h and then cooled down to 95° C. At this temperature, water (19.9 g) was added within 3 h and the mixture was then stirred for a further 11 h.

GPC (in THF) gave an Mn=1210 g/mol, Mw=2330 g/mol for the copolymer, which corresponds to a polydispersity of 1.9.

Synthesis Example 2

A 6 L metal reactor having an anchor stirrer was initially charged with a mixture of $C_{20}$-$C_{24}$ olefins (1743 g, average molar mass 296 g/mol) and Solvesso 150 (1297 g, DHC Solvent Chemie GmbH, Speldorf). The mixture was heated to 150° C. in a nitrogen stream and while stirring. To this were added, within 5 h, a solution of di-tert-butyl peroxide (118.4 g, from Akzo Nobel) in Solvesso 150 (1041 g) and molten maleic anhydride (577 g). The reaction mixture was stirred at 150° C. for 1 h and then cooled down to 110° C. At this temperature, water (95 g) was added with increasing pressure and then the mixture was stirred for a further 3 h. GPC (in THF) gave an Mn=1420 g/mol, Mw=2500 g/mol for the copolymer, which corresponds to a polydispersity of 1.8.

Synthesis Example 3

A 6 L metal reactor having an anchor stirrer was initially charged with a mixture of $C_{20}$-$C_{24}$ olefins (1743 g, average molar mass 296 g/mol) and Solvesso 150 (1297 g, DHC Solvent Chemie GmbH, Speldorf). The mixture was heated to 150° C. in a nitrogen stream and while stirring. To this were added, within 5 h, a solution of di-tert-butyl peroxide (23.7 g, from Akzo Nobel) in Solvesso 150 (912 g) and molten maleic anhydride (577 g). The reaction mixture was stirred at 150° C. for 1 h and then cooled down to 110° C. At this temperature, water (95 g) was added with increasing pressure and then the mixture was stirred for a further 3 h.

GPC (in THF) gave an Mn=1500 g/mol, Mw=3200 g/mol for the copolymer, which corresponds to a polydispersity of 2.1.

Use Examples

The additive formulations specified in table 2 were produced from the above synthesis examples by mixing with polyisobuteneamine (molar mass 1000), polypropylene glycol as carrier oil and solvent and dehazer and used in the use examples (compositions in parts by weight).

Figure 1:
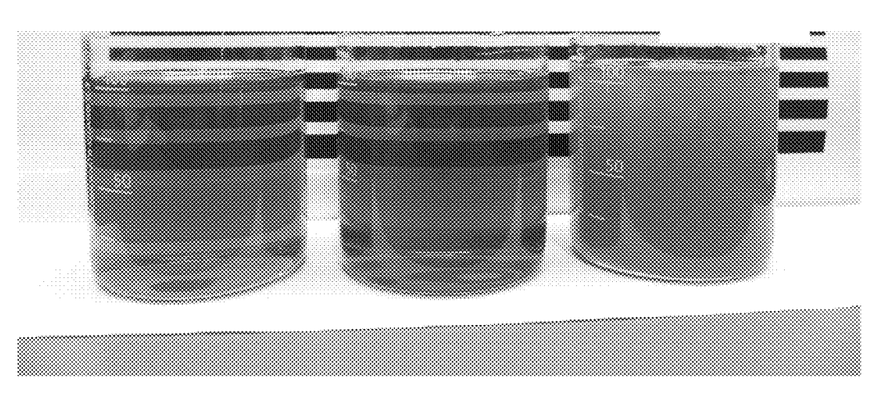
FIG. 1 depicts photographs of the results for three calcium compatibility tests.

1) Calcium Compatibility Test:

100 mL of motor oil (Shell Helix®, FIG. 1, far left beaker, with a Ca content of 1500 ppm, Mg content of 1100 ppm and Zn content of 1300 ppm) were heated to 70° C. in the beaker and then 1 mL of corrosion inhibitor was added. Should the solution still be clear, a further 1 mL of inhibitor is added. If the solution turns cloudy, the test is considered to have been failed (e.g. FIG. 1, right-hand beaker). FIG. 1 shows, in the middle, the oil which has been admixed with copolymer according to synthesis example 1 (50% in solvent naphtha) and remains clear. In the right-hand beaker, dimer fatty acid (dimeric oleic acid; CAS: 61788-89-4, 20% in solvent naphtha) was used. Clearly visible cloudiness is apparent.

2) Steel Corrosion Test in Accordance with ASTM D 665 B a) The fuel used was commercial 95 octane E0 gasoline fuel from Haltermann, additized with an additive package composed of polyisobutenamine and carrier oil. Added to the formulation were the corrosion inhibitors specified in the table that follows, and they were subjected to a corrosion test in accordance with ASTM D 665 B.

The comparison used was dimer fatty acid (dimeric oleic acid; CAS: 61788-89-4 as corrosion inhibitor, 20% in solvent naphtha).

| | Corrosion inhibitor | Active content of corrosion inhibitor [ppm] | NACE rating |
|---|---|---|---|
| Base value - Haltermann E0 (no additization) | — | — | D |
| Base value - Haltermann E0 (with additization) | — | — | E |
| Formulation 1 | dimer fatty acid | 2 | A |
| Formulation 2 | synthesis example 1 | 2.5 | A |
| Formulation 3 | synthesis example 1 | 5 | A |

The assessment was made as follows:
A 100% rust-free
B++ 0.1% or less of the total surface area rusted
B+0.1% to 5% of the total surface area rusted
B 5% to 25% of the total surface area rusted
C 25% to 50% of the total surface area rusted
D 50% to 75% of the total surface area rusted
E 75% to 100% of the total surface area rusted b) A further experiment was conducted analogously to a), but with an E0 gasoline fuel KS-0001829 CEC DF-12-09.
The results are as follows:

| | Corrosion inhibitor | Active content of corrosion inhibitor [ppm] | NACE rating |
|---|---|---|---|
| KS-0001829 base value (no additization) | — | — | E |
| Formulation 13 | dimer fatty acid | 2 | A |
| Formulation 14 | synthesis example 2 | 2 | A |
| Formulation 1 | dimer fatty acid | 2 | A |
| Formulation 7 | synthesis example 3 | 2 | B+ |
| Formulation 11 | dimer fatty acid | 2 | C | c) A further experiment was conducted analogously to a), but with a KS-0001858 MIRO 95 OCTANE E10 gasoline fuel.
The results are as follows:

| | Corrosion inhibitor | Active content of corrosion inhibitor [ppm] | NACE rating |
|---|---|---|---|
| KS-0001858 base value (no additization) | — | — | E |
| Formulation 13 | dimer fatty acid | 2 | B++ |
| Formulation 14 | synthesis example 2 | 2 | B+ |
| Formulation 1 | dimer fatty acid | 2 | A |
| Formulation 7 | synthesis example 3 | 2 | A |
| Formulation 11 | dimer fatty acid | 2 | B+ | d) The test was conducted in accordance with standard ASTM D665 A (modified) with distilled water and ASTM D665 B (modified) with synthetic seawater in a mixture with diesel based fuel in accordance with EN590 B7, without performance additives. The modifications were that the temperature was 60° C. and the duration of the test was 4 hours.

| Addition | Assessment in the ASTM D665A test (with distilled water) | Assessment in the ASTM D665B test (with synthetic seawater) |
|---|---|---|
| No additions | B | E |
| 140 mg/kg of sample according to preparation example 1 | A | B |

3) Copper Corrosion a) In Gasoline

Copper coupons (dimensions 49×25×1.5 mm, hole punched in the middle) were polished cautiously on both sides and on all edges with a polishing machine having the appropriate polishing brush without firm pressure. The polished coupons were rubbed thoroughly several times with a clean cloth with xylene and acetone, using rubber gloves. A 250 mL screwtop glass bottle was filled with 200 mL of fuel. The coupon was secured by a thread and suspended in the fuel bottle. The thread was clamped in the screw thread for fixing.

Storage was effected at room temperature (23° C.). After the first storage period (7 days) had passed, a sample was taken (20-30 mL), the glass bottle was closed again and the metal content was ascertained by means of atomic absorption spectroscopy. The storage was continued. After repeated removal and dropping of the liquid level, it was ensured that the copper coupon is fully covered by fuel.

The results are listed in table 1.

It is apparent from the results in table 1 that the compounds of the invention used, in equal dosage, exhibit a lower tendency to leach copper out of wetted surfaces in fuels than the dimer fatty acid used for comparison.

TABLE 1

| | | Fuel E0 from 2)b) Duration [days] 7 | Fuel E0 from 2)b) Duration [days] 14 | Fuel E0 from 2)b) Duration [days] 28 | Fuel E10 from 2)c) Duration [days] 7 | Fuel E10 from 2)c) Duration [days] 14 | Fuel E10 from 2)c) Duration [days] 28 |
|---|---|---|---|---|---|---|---|
| | Active component | Active component mg/kg | Copper content mg/kg | Copper content mg/kg | Copper content mg/kg | Copper content mg/kg | Copper content mg/kg |
| No additization | — | — | <0.1 | <0.1 | — | 0.4 | 0.7 |
| Formulation 12 | — | — | 0.1 | 0.2 | — | 0.5 | 0.8 |
| Formulation 1 | dimer fatty acid | 2.0 | 0.2 | 0.4 | 0.8 | 0.9 | 1.7 |
| Formulation 4 | synthesis example 2 | 2.0 | 0.1 | 0.2 | 0.4 | 0.8 | 1.4 |
| Formulation 5 | synthesis example 2 | 4.0 | 0.2 | 0.3 | 0.6 | 1 | 1.7 |
| Formulation 6 | synthesis example 2 | 8.0 | 0.3 | 0.5 | 0.7 | 1.2 | 1.8 |
| Formulation 7 | synthesis example 3 | 2.0 | 0.1 | 0.3 | 0.5 | 0.9 | 1.4 |
| Formulation 8 | synthesis example 3 | 4.0 | 0.2 | 0.4 | 0.6 | 1.1 | 1.7 |
| Formulation 9 | synthesis example 3 | 8.0 | 0.3 | 0.5 | 0.8 | 1 | 1.8 |

Wait, the last column (28 days E10) values: 3, 2.5, 3, 3, 2.7, 3, 2.8 for formulations 1,4,5,6,7,8,9 and — for no additization and formulation 12.

TABLE 1 (corrected)

| | Active component | Active component mg/kg | Copper content mg/kg (E0, 7d) | Copper content mg/kg (E0, 14d) | Copper content mg/kg (E0, 28d) | Copper content mg/kg (E10, 7d) | Copper content mg/kg (E10, 14d) | Copper content mg/kg (E10, 28d) |
|---|---|---|---|---|---|---|---|---|
| No additization | — | — | <0.1 | <0.1 | — | 0.4 | 0.7 | — |
| Formulation 12 | — | — | 0.1 | 0.2 | — | 0.5 | 0.8 | — |
| Formulation 1 | dimer fatty acid | 2.0 | 0.2 | 0.4 | 0.8 | 0.9 | 1.7 | 3 |
| Formulation 4 | synthesis example 2 | 2.0 | 0.1 | 0.2 | 0.4 | 0.8 | 1.4 | 2.5 |
| Formulation 5 | synthesis example 2 | 4.0 | 0.2 | 0.3 | 0.6 | 1 | 1.7 | 3 |
| Formulation 6 | synthesis example 2 | 8.0 | 0.3 | 0.5 | 0.7 | 1.2 | 1.8 | 3 |
| Formulation 7 | synthesis example 3 | 2.0 | 0.1 | 0.3 | 0.5 | 0.9 | 1.4 | 2.7 |
| Formulation 8 | synthesis example 3 | 4.0 | 0.2 | 0.4 | 0.6 | 1.1 | 1.7 | 3 |
| Formulation 9 | synthesis example 3 | 8.0 | 0.3 | 0.5 | 0.8 | 1 | 1.8 | 2.8 |

TABLE 2

| | Polyisobutene-amine | Carrier oil | Dimer fatty acid | Synthesis example 1 (50% in Solvent Naphtha) | Synthesis example 2 (40% in Solvent Naphtha) | Synthesis example 3 (40% in Solvent Naphtha) | Solvent + dehazer | Total |
|---|---|---|---|---|---|---|---|---|
| Formulation 1 | 248 | 195 | 10 | | | | 47 | 500 |
| Formulation 2 | 248 | 195 | | 5 | | | 47 | 495 |
| Formulation 3 | 248 | 195 | | 10 | | | 47 | 500 |
| Formulation 4 | 248 | 195 | | | 5 | | 47 | 495 |
| Formulation 5 | 248 | 195 | | | 10 | | 47 | 500 |
| Formulation 6 | 248 | 195 | | | 20 | | 47 | 510 |
| Formulation 7 | 248 | 195 | | | | 5 | 47 | 495 |
| Formulation 8 | | | | | | 10 | 47 | 500 |
| Formulation 9 | | | | | | 20 | 47 | 510 |
| Formulation 10 | 248 | 195 | | | 30 | | 47 | 520 |
| Formulation 11 | 248 | 195 | 5 | | | | 47 | 495 |
| Formulation 12 | 248 | 195 | | | | | 47 | 490 |
| Formulation 13 | 259 | 156 | 10 | | | | 596 | 1021 |
| Formulation 14 | 259 | 156 | | | 5 | | 596 | 1016 | b) In Diesel Fuel

To examine the corrosion characteristics of the sample from synthesis example 1 with respect to nonferrous metals, tests were conducted with zinc and copper wires.

80 mL of Aral B7 EN590 fuel were dispensed into four bottles, to two of which were added 140 ppm of a sample from synthesis example 1. In one bottle with this sample and in one bottle without this sample was positioned degreased copper wire of length 20 cm and diameter 1 mm. Analogously, in one bottle with this sample and in one bottle without this sample was positioned degreased zinc wire of length 20 cm and diameter 1 mm. The copper or zinc content of the original fuel and after 6 weeks' storage was determined by means of atomic emission spectroscopy (ICP/OES) at 40° C.

| | Fuel (start) | Fuel (no addition, 6 weeks at 40° C.) | Fuel (addition of 140 ppm, 6 weeks at 40° C.) |
|---|---|---|---|
| Zn content [mg/kg] | <1 | <1 | <1 |
| Cu content [mg/kg] | <1 | 4 | <1 |

It is apparent that the compounds of the invention have a corrosion-inhibiting effect on nonferrous metals, especially on copper.

4) PFI Engine Test DC M111E

An engine test over 60 hours was conducted in accordance with CEC F-020-98 with MIRO 95 octane E10 fuel and the deposits on the intake valves (internal valve deposits, IVD) and in the combustion chamber (total chamber deposits, TCD values) were determined.

In keep-clean mode, a TCD value of 4122 mg was found for the additized fuel without corrosion inhibitor, by contrast with a TCD value of 3940 mg for the additized fuel comprising corrosion inhibitor (formulation 10).

In addition, an IVD value of 116 mg/valve was found for the unadditized fuel and, in keep-clean mode, an IVD value of 2 mg/valve for the additized fuel without corrosion inhibitor, by contrast with an IVD value of 1 mg/valve for the additized fuel comprising corrosion inhibitor (formulation 10).

5) Keep Clean Test in a Direct Injection Gasoline Engine (DISI)

A commercially available DISI (direct injection spark ignition) engine (cylinder capacity 1.6 liters) was operated with an E10 gasoline fuel from MIRO (7% by volume of oxygen-containing components) at a speed of 4000 rpm for 50 hours.

In the first run, the fuel did not comprise any additives. The FR value oscillated between 0 and −1.

In the second run, the fuel comprised 520 mg/kg of formulation 10. The FR value oscillated between −2 and −3.

The FR value was determined in both runs. FR is a parameter which is generated by the engine management system according to the fuel injection into the combustion chamber. The formation of deposits is manifested by a rising FR value during a run. The more it grows, the more deposits are formed. If the FR value remains constant or decreases, the injector nozzle will also remain clean. In neither case is there any rise in the FR value, which indicates that the copolymer claimed does not have any adverse effect on injector cleanliness.

The invention claimed is:

1. A method for inhibiting corrosion of a metal surface, the method comprising:
    applying a corrosion inhibitor to at least one of an iron surface, a steel surface and a nonferrous metal surface, wherein the corrosion inhibitor comprises a copolymer obtained by a process comprising:
    copolymerizing by addition polymerization:
        (A) at least one ethylenically unsaturated mono- or dicarboxylic acid or a derivative thereof selected from the group consisting of an anhydride in a monomeric or a polymeric form, a mono- or dialkyl ester, and a mixed ester,
        (B) at least one α-olefin comprising from 16 to 28 carbon atoms,
        (C) optionally at least one aliphatic or cycloaliphatic olefin which comprises at least 4 carbon atoms and is different than (B), and
        (D) optionally at least one copolymerizable monomer other than (A), (B) and (C), which is selected from the group consisting of (Da) a vinyl ester, (Db) a vinyl ether, (Dc) a (meth)acrylic ester of an alcohol comprising at least 5 carbon atoms, (Dd) an allyl alcohol or ether thereof, (De) a N-vinyl compound selected from the group consisting of a vinyl compound of a heterocycle comprising at least one nitrogen atom, a N-vinylamide, and a N-vinyllactam, (Df) an ethylenically unsaturated aromatic, (Dg) an α,β-ethylenically unsaturated nitrile, (Dh) a (meth)acrylamide, and (Di) an allylamine,
    thereby obtaining a first copolymer; and
    subsequently partly or fully hydrolyzing anhydride or carboxylic ester functionalities present in the first copolymer into acid groups so that a content of the acid groups in the copolymer is from 1 to 8 mmol acid groups per gram of the copolymer, thereby obtaining the copolymer,
    wherein the copolymer has a weight-average molecular weight Mw determined by gel permeation chromatography with tetrahydrofuran and polystyrene as standard of 1.5 to 4 kDa.

2. The method of claim 1, wherein (A) is at least one selected from the group consisting of acrylic acid, methacrylic acid, methyl acrylate, ethyl acrylate, n-butyl acrylate, methyl methacrylate, and maleic anhydride.

3. The method of claim 1, wherein (A) is a dicarboxylic acid or a derivative thereof and is at least one selected from the group consisting of an anhydride in a monomeric or a polymeric form, a mono- or dialkyl ester, and a mixed ester.

4. The method of claim 1, wherein (B) is an α-olefin comprising from 18 to 26 carbon atoms.

5. The method of claim 1, wherein (C) is present during said copolymerizing and is a polymer comprising more than 30 carbon atoms of propene, 1-butene, 2-butene or isobutene, or an olefin mixture comprising the latter and having a weight-average molecular weight $M_w$ in the range of from 500 to 5000 g/mol.

6. The method of claim 1, wherein
    (C) is present during said copolymerizing,
    (C) is a polymer of isobutene or an olefin mixture comprising the latter,
    (C) has more than 30 carbon atoms, and
    (C) has a weight-average molecular weight $M_w$ of from 500 to 5000 g/mol.

7. The method of claim 1, wherein
    (C) is present during said copolymerizing, and
    an averaged molar amount of a mixture of (B) and (C) comprises at least 12 carbon atoms.

8. The method of claim 1, wherein
    (D) is present during said copolymerizing, and
    (D) is at least one selected from the group consisting of (Da), (Db), (Dc), (De) and (Df).

9. The method of claim 1, wherein
    (C) is present during said copolymerizing, and
    a molar ratio of (A)/[(B)+(C)] is from 10:1 to 1:10.

10. The method of to claim 9, wherein a molar ratio of (B) to (C) is from 1:0.05 to 10.

11. The method of claim 1, wherein
    (D) is present during said copolymerizing, and
    a proportion of (D), based on a total amount of (A) (B), and optionally (C), is from 5 to 200 mol %.

12. The method of claim 1, wherein the corrosion inhibitor is contained in a fuel, comprising:
    at least one alkali metal, at least one alkaline earth metal, zinc, or a mixture comprising at least two thereof, in a total content of at least 0.1 ppm by weight; and
    the corrosion inhibitor.

13. The method of claim 12, wherein the fuel comprises at least one selected from the group consisting of sodium, magnesium, and calcium.

14. The method of claim 12, wherein the fuel is a diesel fuel or a gasoline fuel.

15. The method of claim 1, comprising applying the corrosion inhibitor to a nonferrous metal surface comprising a copper or a copper-containing alloy.

* * * * *

UNITED STATES PATENT AND TRADEMARK OFFICE
CERTIFICATE OF CORRECTION

Page 1 of 1

PATENT NO. : 10,377,958 B2
APPLICATION NO. : 15/115594
DATED : August 13, 2019
INVENTOR(S) : Jochen Mezger et al.

It is certified that error appears in the above-identified patent and that said Letters Patent is hereby corrected as shown below:

In the Specification

Column 6, Line 38, "2-ethyl hexyl" should read -- 2-ethylhexyl --,

Column 14, Lines 23-24, "2-ethyl hexanoate" should read -- 2-ethylhexanoate --, In the Claims Column 26, Line 33, Claim 10, "The method of to claim 9, wherein a molar ratio of (B)" should read -- The method of claim 9, wherein a molar ratio of (B) --, Column 26, Line 37, Claim 11, "(A)" should read -- (A), --.

Signed and Sealed this
Thirty-first Day of March, 2020

Andrei Iancu
*Director of the United States Patent and Trademark Office*